United States Patent
Park et al.

(10) Patent No.: US 9,042,015 B2
(45) Date of Patent: May 26, 2015

(54) METHOD AND APPARATUS FOR DISPLAYING IMAGE

(75) Inventors: Taewoong Park, Gyeonggi-Do (KR); Kyuyeol Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 13/483,760

(22) Filed: May 30, 2012

(65) Prior Publication Data
US 2013/0010358 A1    Jan. 10, 2013

(30) Foreign Application Priority Data
Jul. 6, 2011    (KR) ........................ 10-2011-0067048

(51) Int. Cl.
| | | |
|---|---|---|
| G02B 27/22 | (2006.01) | |
| H04N 13/04 | (2006.01) | |
| H04N 21/44 | (2011.01) | |
| H04N 21/4415 | (2011.01) | |
| H04N 21/442 | (2011.01) | |
| H04N 21/81 | (2011.01) | |

(52) U.S. Cl.
CPC ........ *H04N 13/0452* (2013.01); *H04N 13/0472* (2013.01); *H04N 13/0497* (2013.01); *H04N 21/44008* (2013.01); *H04N 21/4415* (2013.01); *H04N 21/44218* (2013.01); *H04N 21/816* (2013.01)

(58) Field of Classification Search
None
See application file for complete search history.

(56) References Cited

U.S. PATENT DOCUMENTS

| | | | | |
|---|---|---|---|---|
| 7,053,865 | B2 * | 5/2006 | Takahashi | 345/7 |
| 2007/0164950 | A1 * | 7/2007 | Tajiri | 345/87 |
| 2011/0090323 | A1 * | 4/2011 | Shibata | 348/54 |
| 2011/0164792 | A1 * | 7/2011 | Yoon et al. | 382/118 |

FOREIGN PATENT DOCUMENTS

| | | | |
|---|---|---|---|
| JP | 2011-91481 | A | 5/2011 |
| JP | 2011-124941 | A | 6/2011 |

* cited by examiner

*Primary Examiner* — Jade R Chwasz
(74) *Attorney, Agent, or Firm* — Birch, Stewart, Kolasch & Birch, LLP

(57) ABSTRACT

The present disclosure relates to an apparatus for displaying a stereoscopic image, and there is provided an image display method, and the method may include acquiring information on a user's face; determining whether to allow a stereoscopic image based on the face information; and displaying an image based on a result of the determination as to whether to allow a stereoscopic image. Hence, according to the present invention, a person disqualified for viewing a stereoscopic image may be prevented from viewing TV in a stereoscopic image mode.

12 Claims, 12 Drawing Sheets

FIG. 4A

| FACE IMAGE | FATHER (FIRST USER) | MOTHER (SECOND USER) | CHILD (THIRD USER) | BABY(UNDER 5 YEARS OF AGE) (FOURTH USER) |
|---|---|---|---|---|
| WHETHER TO ALLOW STEREOSCOPIC IMAGE | FIRST CONFIGURATION | FIRST CONFIGURATION | SECOND CONFIGURATION | THIRD CONFIGURATION |
| TIME LIMIT | | | 30MINUTES | |

FIG. 4B

| INTERPUPILLARY DISTANCE | WHETHER TO ALLOW STEREOSCOPIC IMAGE | TIME LIMIT |
|---|---|---|
| ABOVE 5.5cm | FIRST CONFIGURATION | |
| ABOVE 5cm BUT UNDER 5.5cm | SEOCND CONFIGURATION | 30 MINUTES |
| UNDER 5cm | THIRD CONFIGURATION | |

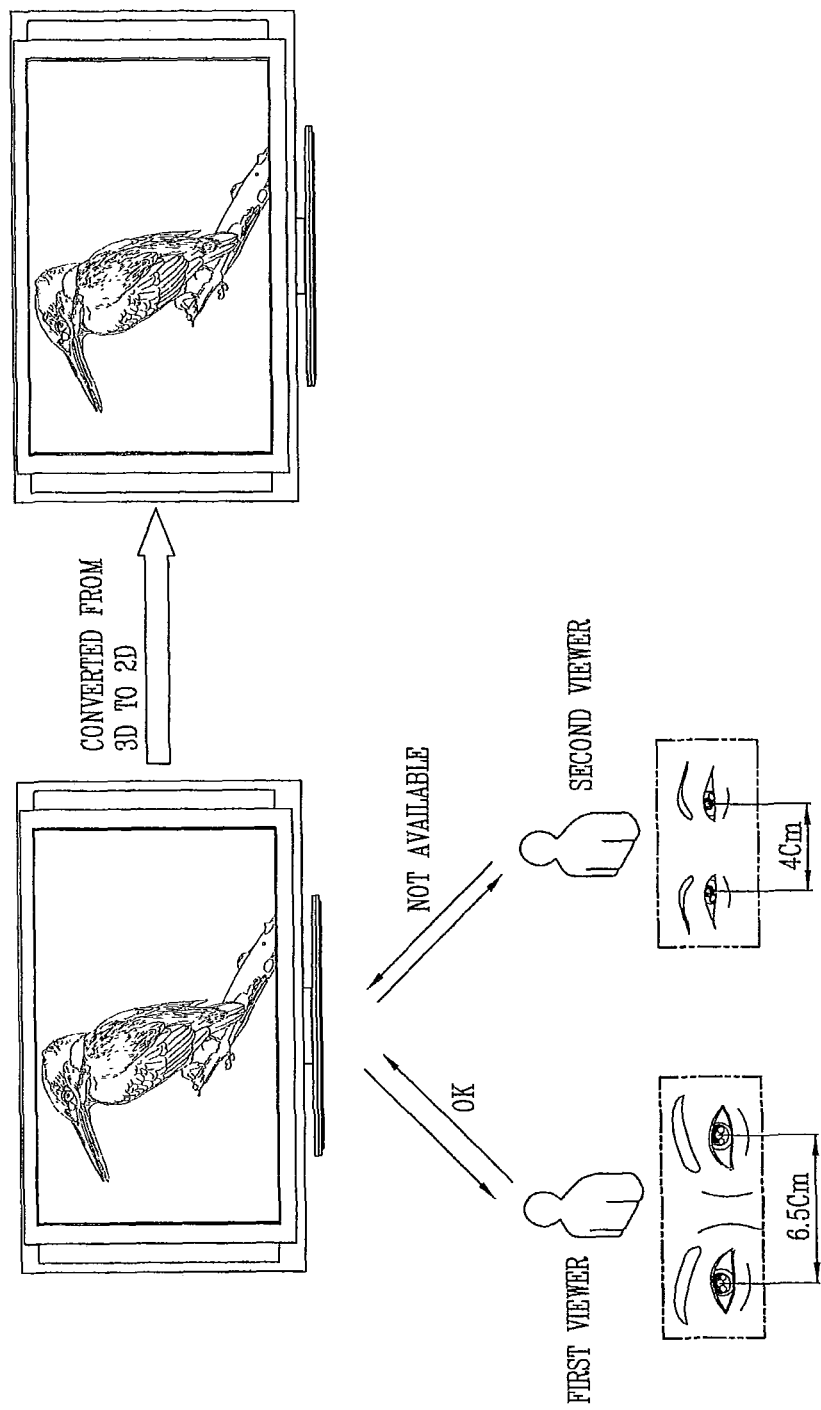

| INTERPUPILLARY DISTANCE | WHETHER TO ALLOW STEREOSCOPIC IMAGE |
|---|---|
| ABOVE 5.5cm | FIRST CONFIGURATION |
| ABOVE 5cm BUT UNDER 5.5cm | SEOCND CONFIGURATION |
| UNDER 5cm | THIRD CONFIGURATION |

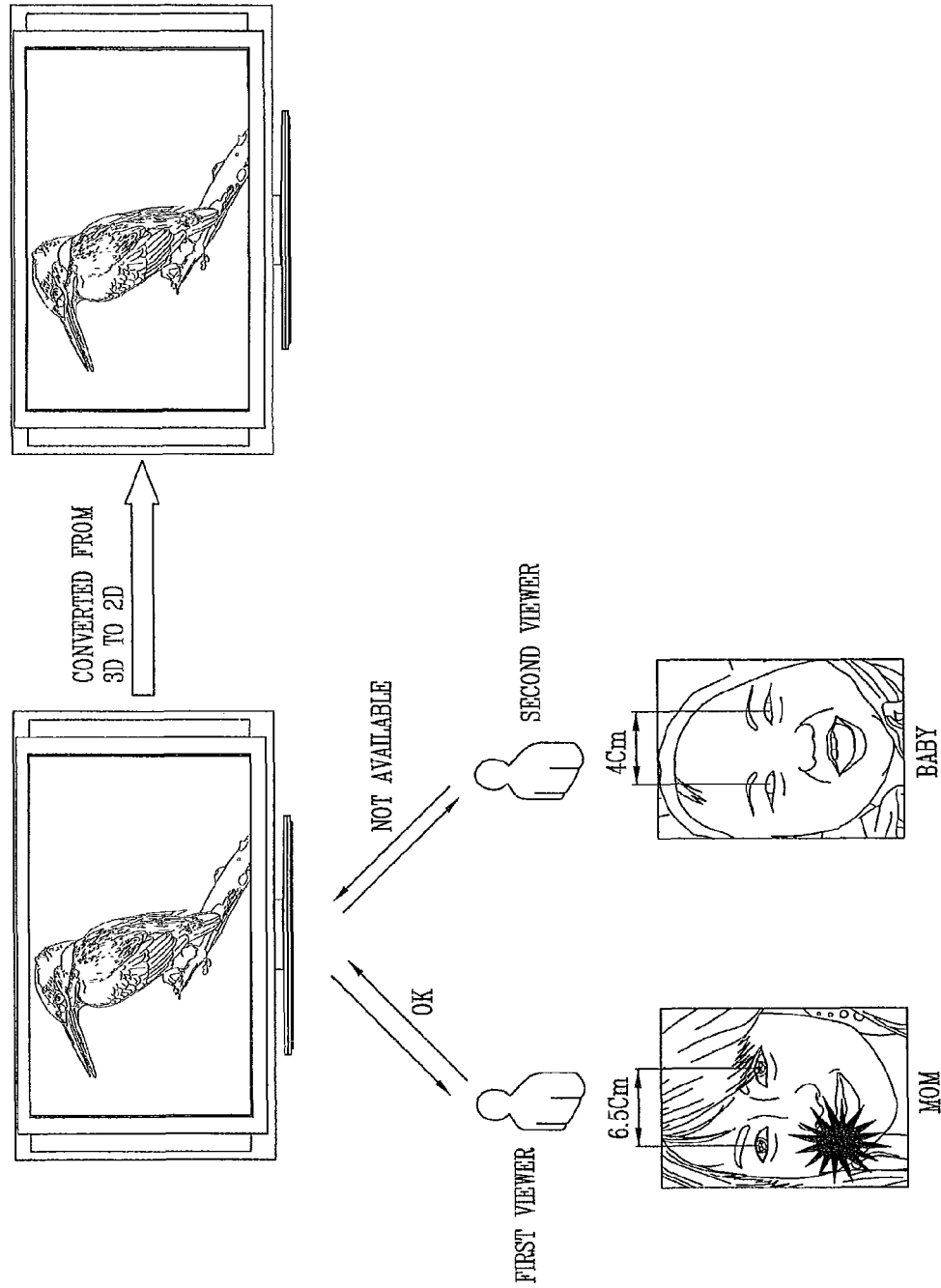

| INTERPUPILLARY DISTANCE | WHETHER TO ALLOW STEREOSCOPIC IMAGE |
|---|---|
| ABOVE 5.5cm | FIRST CONFIGURATION |
| ABOVE 5cm BUT UNDER 5.5cm | SEOCND CONFIGURATION |
| UNDER 5cm | THIRD CONFIGURATION |

METHOD AND APPARATUS FOR DISPLAYING IMAGE

RELATED APPLICATION

Pursuant to 35 U.S.C. §119(a), this application claims the benefit of Korean Application No. 10-2011-0067048, filed on Jul. 6, 2011, the contents of which is incorporated by reference herein in its entirety.

BACKGROUND OF THE INVENTION

1. Field of the Invention

The present information relates to an image display method and apparatus, and more particularly, to an image display method and apparatus for determining whether to allow a stereoscopic image in an image display apparatus and converting the stereoscopic image in the image display apparatus into a planar image as a result of the determination.

2. Description of the Related Art

In recent years, broadcast services for a 3-dimensional image or stereoscopic image have been expanded.

The stereoscopic image may be divided into a two-view image, a multi-view image, and the like, based on the number of displayable images, and a viewing zone should be formed to view a stereoscopic image in such a manner that images corresponding to the left and right eyes are received at the corresponding eyes, respectively. The stereoscopic image method may be largely classified into a glasses method and a no-glasses method according to the viewing zone formation method.

Though such a 3-dimensional TV has been widely used at each home, in case of a specific viewer, there exists a case where viewing 3D images is preferably avoided. In particular, in case of children under 5 years of age, it may cause a problem in the development of normal vision of the eyes, and thus viewing 3D images may not be preferable for them.

SUMMARY OF THE INVENTION

The present invention is conceived to solve the foregoing problems of a 3D TV in the related art, and tasks to be solved in the present invention are as follows.

A task of the present invention is to provide an image display method and apparatus for automatically converting a stereoscopic image into a planar image, if required, based on the user's face information.

Another task of the present invention is to provide an image display method and apparatus for providing various methods for determining whether to allow a stereoscopic image.

Still another task of the present invention is to provide an image display method and apparatus for allowing the user to input a criterion for determining whether to allow a stereoscopic image.

Still another task of the present invention is to provide an image display method and apparatus for storing data for the user, and determining whether to allow a stereoscopic image based on the user data.

Still another task of the present invention is to provide an image display method and apparatus for displaying a configuration in which displaying stereoscopic images is restricted.

Technical problems to be solved in the present invention are not restricted to the above-mentioned problems and other technical problems which are not mentioned herein will definitely be understood by those skilled in the art from the following description.

The present invention provides an image display method and apparatus as described below to solve the foregoing tasks.

An image display method in accordance with an aspect of the present invention may include acquiring information on a user's face, determining whether to allow a stereoscopic image based on the face information, and displaying an image based on a result of the determination as to whether to allow a stereoscopic image.

According to an image display method in accordance with another aspect of the present invention, the user's face information may include at least one of an interpupillary distance and a face image.

According to an image display method in accordance with still another aspect of the present invention, as a result of performing the determination of whether to allow a stereoscopic image, the whether to allow a stereoscopic image may be classified as at least one of a first configuration in which displaying a stereoscopic image is enabled for the user, a second configuration in which displaying a stereoscopic image is enabled for a limited period of time, and a third configuration in which displaying a stereoscopic image is disabled based on the information.

According to an image display method in accordance with still another aspect of the present invention, when the whether to allow a stereoscopic image is determined as a second configuration or third configuration, said displaying an image may include converting a stereoscopic image into a planar image.

According to an image display method in accordance with still another aspect of the present invention, when the whether to allow a stereoscopic image may be determined as a second configuration, said displaying an image comprises converting a stereoscopic image into a planar image after a limited period of time.

According to an image display method in accordance with still another aspect of the present invention, said determining whether to allow a stereoscopic image may determine the whether to allow a stereoscopic image as a first configuration when the interpupillary distance corresponds to a preset first range, determine the whether to allow a stereoscopic image as a second configuration when the interpupillary distance corresponds to a preset second range, or determine the whether to allow a stereoscopic image as a third configuration when the interpupillary distance corresponds to a preset third range.

According to an image display method in accordance with still another aspect of the present invention, said determining whether to allow a stereoscopic image may determine the whether to allow a stereoscopic image as a first configuration when the face image is the same as a prestored first image, determine the whether to allow a stereoscopic image as a second configuration when the face image is the same as a prestored second image, or determine the whether to allow a stereoscopic image as a third configuration when the face image is the same as a prestored third image.

An image display method in accordance with still another aspect of the present invention may include storing at least one of a face image, whether to allow a stereoscopic image, and a time limit in the user DB.

An image display method in accordance with still another aspect of the present invention may further include storing at least one of an interpupillary distance criterion for determining whether to allow a stereoscopic image and a time limit.

An image display method in accordance with still another aspect of the present invention may further include displaying a message or image as to whether to allow a stereoscopic image.

An image display method in accordance with still another aspect of the present invention may include displaying at least one of a time limit, a remaining time up to an image mode conversion, and a viewing time when the result of determining whether to allow a stereoscopic image is a second configuration.

An image display apparatus in accordance with an aspect of the present invention may include a sensor unit configured to acquire information on a user's face, a controller configured to determine whether to allow a stereoscopic image based on the face information, and a display unit configured to display an image based on a result of the determination as to whether to allow a stereoscopic image.

An image display apparatus in accordance with another aspect of the present invention may include a storage unit configured to store at least one of a face image, whether to allow a stereoscopic image, and a time limit in the user DB.

An image display apparatus in accordance with still another aspect of the present invention may include a storage unit configured to store at least one of an interpupillary distance criterion for determining whether to allow a stereoscopic image and a time limit.

An image display apparatus in accordance with still another aspect of the present invention may include a display unit configured to display whether to allow a stereoscopic image.

The present disclosure may have the following effects.

According to the present invention, it may have an effect of preventing a person disqualified for viewing a stereoscopic image from viewing TV in a stereoscopic image mode.

According to the present invention, whether he or she corresponds to a person disqualified for viewing a stereoscopic image may be determined by using various methods, thereby enhancing the accuracy of the determination.

According to the present invention, whether to allow a stereoscopic image may be entered by the user in various modes, thereby allowing a stereoscopic image display apparatus to be suitably changed and used according to the use environment.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4A is a view illustrating an example in which a face image, whether to allow a stereoscopic image, a time limit are entered in the user DB by the input unit, and FIG. 4B is an view illustrating an example in which an interpupillary distance criterion and a time limit for determining whether to allow a stereoscopic image are entered in the input unit;

FIGS. 6A, 6B and 6C (also referred to herein below as FIG. 6) are views illustrating an image display method according to a first embodiment of the present invention;

FIGS. 7A, 7B, 7C and 7D (also referred to herein as FIG. 7) are views illustrating an image display method according to a second embodiment of the present invention.

DETAILED DESCRIPTION OF THE INVENTION

Figure 1:
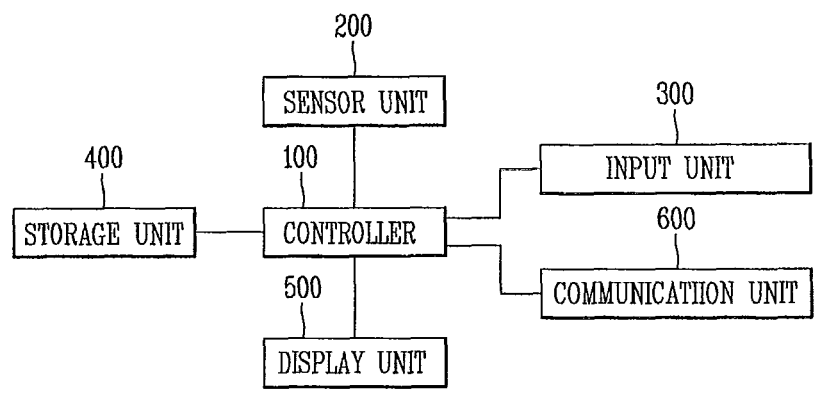
FIG. 1 is a block diagram illustrating an image display apparatus associated with an embodiment of the present invention.

The terms used in the present invention will be briefly described and the present invention will be described in detail below.

Although the terms used in the present invention are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Throughout the specification, when a part may "include" a certain constituent element, unless specified otherwise, it may not be construed to exclude another constituent element but may be construed to further include other constituent elements. The terms such as "~portion", "~unit", "~module", and the like stated in the specification may signify a unit to process at least one function or operation and one that may be embodied by hardware, software, or a combination of hardware and software.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

FIG. 1 is a block diagram illustrating an image display apparatus associated with an embodiment of the present invention.

Referring to FIG. 1, an image display apparatus according to the present invention may include a controller 100, a sensor unit 200, an input unit 300, a storage unit 400, a display unit 500, and a communication unit 600.

The sensor unit 200 may recognize the face information of a viewer viewing TV. The sensor unit 200 may be configured by using a camera, and the like. Furthermore, if necessary, the sensor unit 200 may be configured by using a plurality of cameras, and the like. In addition, the sensor unit 200 may not be included in an image display apparatus. In this case, an image captured by a device at the outside of the image display apparatus may be provided to the controller 100.

The controller 100 may control the sensor unit 200, the input unit 300, the storage unit 400, the display unit 500, and the communication unit 600 as a whole. Furthermore, the controller 100 may determine whether a stereoscopic image is allowed to be in a displayable state based on face information recognized in the sensor unit 200, a criterion for determining whether to allow a stereoscopic image received from the input unit 300 stored in the storage unit 400, user DB, and the like. The controller 100 may be included in the main controller of the stereoscopic image display apparatus. Otherwise, the controller 100 may be separately provided without being included in the main controller of the stereoscopic image display apparatus.

The input unit 300 may receive information from the user. For example, the input unit 300 may include a plurality of buttons, a touch pad, a voice recognition device, a camera, and the like. Furthermore, information that can be received from the user through the input unit 300, for example, may include a user's face image, whether to allow a stereoscopic image for the user, a time limit for viewing a stereoscopic image for the user, a interpupillary distance criterion for determining whether to allow a stereoscopic image, a time limit in case where the interpupillary distance corresponds to a viewing time limit range, and the like.

The storage unit 400 may receive information from the communication unit 600, the input unit 300, the sensor unit 200, and the controller 100 to store it therein. Furthermore, the storage unit 400 may provide information through the controller 100.

The display unit 500 may receive information from the controller 100 and display the information on the screen. For example, the information that can be displayed on the display unit 500 may include whether to allow a stereoscopic image, a time limit, a viewing time, a remaining time up to an image mode conversion, and the like.

The communication unit 600 may perform communication with an external device. The communication may be wired or wireless communication through a wired or wireless network. The communication unit 600 may receive the information through the communication with an external device. For example, the information input to the input unit 300 may be received through the communication unit 600.

Figure 2:
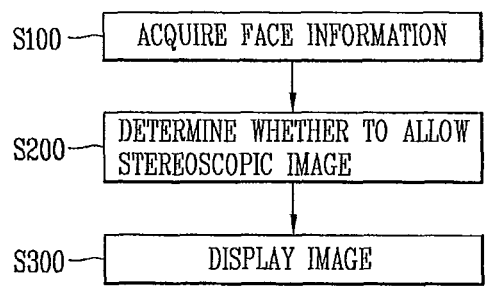
FIG. 2 is a flow chart illustrating an image display method associated with according to an embodiment of the present invention.

FIG. 2 is a flow chart illustrating an image display method associated with according to an embodiment of the present invention.

An image display method according to an embodiment of the present invention may include acquiring a viewer's face information (S100), determining whether to allow a stereoscopic image based on the face information (S200), and displaying an image based on a result of the determination as to whether to allow a stereoscopic image (S300).

The step of acquiring a viewer's face information (S100) may be carried out by the sensor unit 200. The face information may include a viewer's face image, the viewer's eye distance, the viewer's face size, and the like. The viewer's eye distance may be measured on the basis of an interpupillary distance of the viewer, a binocular inner end distance, a binocular outer end distance, and the like. Furthermore, the interpupillary distance may be measured on the basis of the center of a binocular iris.

In addition, according to the foregoing image display method, it may be set in advance which face information will be acquired for the user, and thus preset face information among the face information may be acquired in the step of acquiring the face information (S100).

In the step of determining whether to allow a stereoscopic image (S200), it may be determined whether or not it is a situation in which the viewer is allowed to view in a stereoscopic image mode. The information that can be received from the storage unit 400 may include a user's face image stored in the user DB, whether to allow a stereoscopic image for the user's face image, a time limit in case where whether to allow a stereoscopic image is determined as a second configuration, a interpupillary distance criterion for determining whether to allow a stereoscopic image, a time limit in case where whether to allow a stereoscopic image is determined as a second configuration by an interpupillary distance, and the like.

On the other hand, in the step of determining whether to allow a stereoscopic image (S200), a situation where it is determined that there is no problem for a target viewer to view a stereoscopic image may be defined as a first configuration. Furthermore, a situation where it is determined that there is no problem for a target viewer to view a stereoscopic image for a preset period of time may be defined as a second configuration. In addition, a situation where it is determined that viewing a stereoscopic image should be limited for a target viewer may be defined as a third configuration.

Whether to allow a stereoscopic image may be determined on the basis of a viewer's interpupillary distance among the face information.

TABLE 1

| Interpupillary distance | Whether to allow a stereoscopic image |
| --- | --- |
| First range | First configuration |
| Second range | Second configuration |
| Third range | Third configuration |

The above Table 1 illustrates a configuration to which whether to allow a stereoscopic image is mapped on the basis of a viewer's interpupillary distance.

In this case, an interpupillary distance where viewing a stereoscopic image should be limited may be defined as a third range. Furthermore, an interpupillary distance where viewing a stereoscopic image should be allowed in a limited manner may be defined as a second range. In addition, an interpupillary distance where viewing a stereoscopic image is allowed may be defined as a first range. According to an embodiment of the present invention, for instance, a viewer having an interpupillary distance less than 5 cm may be a target viewer to which viewing a stereoscopic image is limited according to an interpupillary distance. Furthermore, a viewer having an interpupillary distance greater than 5 cm but less than 5.5 cm may be a target viewer for which viewing a stereoscopic image is allowed in a limited manner. In addition, a viewer having an interpupillary distance greater than 5.5 cm may be a target viewer for which viewing a stereoscopic image is allowed.

On the other hand, the above criteria are provided to distinguish a baby (under five years of age), a child, and an adult, and similarly they may be selectively determined by taking their districts and races into consideration. In addition, the first range, the second range, and the third range may be manipulated and changed by the user through the input unit.

Referring to FIG. 1, the controller may determine whether to allow a stereoscopic image as a first configuration when the viewer's interpupillary distance corresponding to the first range is recognized, and determine whether to allow a stereoscopic image as a second configuration when the viewer's interpupillary distance corresponding to the second range is recognized, and determine whether to allow a stereoscopic image as a third configuration when the viewer's interpupillary distance corresponding to the third range is recognized. Furthermore, using the foregoing procedure, whether to allow a stereoscopic image may be determined on the basis of the viewer's interpupillary distance.

TABLE 2

| Face image | Whether to allow a stereoscopic image |
|---|---|
| First DB | First configuration |
| Second DB | Second configuration |
| Third DB | Third configuration |

Excluding public places, target viewers using a specific TV terminal are restricted. For example, TV installed at home is mainly used by family members. In this case, as described above, whether to allow a stereoscopic image may be determined according to the foregoing criteria using a viewer's interpupillary distance. However, in a separate manner, the face images of the family members are stored through a viewer's face recognition in the sensor unit to specify a target viewer.

The first DB is a database stored with the face image of a user to whom viewing a stereoscopic image is allowed. Furthermore, the second DB is a database stored with the face image of a user to whom viewing a stereoscopic image is allowed in a limited manner. In addition, the third DB is a database stored with the face image of a user to whom viewing a stereoscopic image is restricted.

An image stored in the first DB may be defined as a first image. Furthermore, an image stored in the second DB may be defined as a second image. In addition, an image stored in the third DB may be defined as a third image.

According to an embodiment of the present invention, whether to allow a stereoscopic image may be determined by using a viewer's face image among the face information. First, a viewer's face image recognized in the sensor unit 200 may be compared with the first through third images. Then, the DB stored with an image matched to the recognized face image is retrieved. Whether to allow a stereoscopic image is determined as a first configuration when the retrieved DB is a first DB. Furthermore, whether to allow a stereoscopic image is determined as a second configuration when the retrieved DB is a second DB. In addition, whether to allow a stereoscopic image is determined as a third configuration when the retrieved DB is a third DB. In this manner, according to an embodiment of the present invention, the viewer's face image may be recognized to determine whether to allow a stereoscopic image.

When viewing a stereoscopic image is restricted by using such various methods, the user convenience may be enhanced, and the accuracy of the determination may be also enhanced.

In the specification of the present invention, a method of determining whether to allow a stereoscopic image on the basis of an interpupillary distance and face image among the face information has been described. However, besides, if the present invention is within the scope that can be easily embodied by a person having ordinary skill in the art to which the present invention pertains, then whether to allow a stereoscopic image may be determined by using information other than the above description.

The step of displaying a image (S300) may include converting a stereoscopic image mode into a planar image mode. In addition, the step of displaying a image (S300) may include converting a planar image into a stereoscopic image.

When the whether to allow a stereoscopic image is a second configuration, a stereoscopic image mode may be converted into a planar image mode after a predetermined period of time. The predetermined period of time may be set by the user through the input unit 300.

Furthermore, when the whether to allow a stereoscopic image is a third configuration, a stereoscopic image mode may be converted into a planar image mode immediately after determining whether to allow a stereoscopic image.

FIG. 3 is a flow chart illustrating an embodiment for determining whether to allow a stereoscopic image based on the two kinds of criteria.

In the above description, a method of determining whether to allow a stereoscopic image based on a viewer's interpupillary distance and a viewer's face image, respectively, has been described. Hereinafter, the detailed embodiment of determining whether to allow a stereoscopic image using the two kinds of criteria will be described.

Figure 3A:
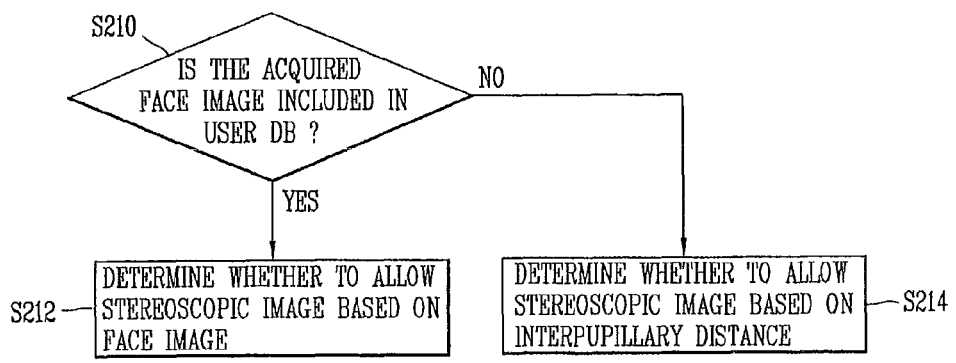
FIGS. 3A and 3B (also referred to herein below as FIG. 3) is a flow charts illustrating an embodiment for determining whether to allow a stereoscopic image based on two kinds of criteria.

FIG. 3A is a flow chart illustrating a method of preferentially determining whether to allow a stereoscopic image on the basis of a face image.

A viewer's face image and a viewer's interpupillary distance among the face information may be acquired by the sensor unit 200 at the same time. The whether to allow a stereoscopic image may be preferentially determined on the basis of a viewer's face image, and thus the step of determining whether to allow a stereoscopic image (S200) may include retrieving whether a viewer's face image acquired in the sensor unit 200 is included in the user DB (S210).

In the retrieval step (S210), when a viewer's face image is included in the user DB, whether to allow a stereoscopic image may be determined on the basis of a method of determining whether to allow a stereoscopic image using a face image (S212). The method of determining whether to allow a stereoscopic image using a face image may use the foregoing method as it is.

In the retrieval step (S210), when a viewer's face image is not included in the user DB, whether to allow a stereoscopic image may be determined on the basis of a method of determining whether to allow a stereoscopic image using an interpupillary distance (S214). The method of determining whether to allow a stereoscopic image using an interpupillary distance may use the foregoing method as it is.

Figure 3B:
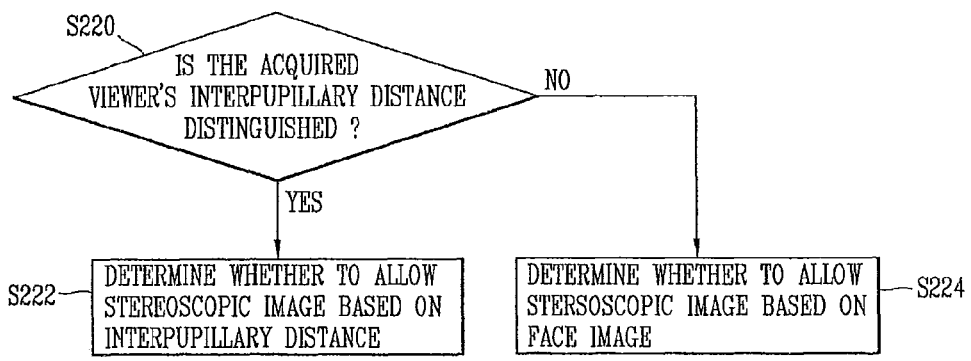

FIG. 3B is a flow chart illustrating a method of preferentially determining whether to allow a stereoscopic image on the basis of a view's interpupillary distance.

The whether to allow a stereoscopic image may be preferentially determined on the basis of a viewer's interpupillary distance, and thus the step of determining whether to allow a stereoscopic image may include retrieving whether a viewer's interpupillary distance acquired in the sensor unit can be recognized (S220).

In the retrieval step (S220), when a viewer's face image can be determined, whether to allow a stereoscopic image may be determined on the basis of a method of determining whether to allow a stereoscopic image using a interpupillary distance (S222). The method of determining whether to allow a stereoscopic image using an interpupillary distance may use the foregoing method as it is.

In the retrieval step (S220), when a viewer's interpupillary distance cannot be accurately determined, whether to allow a stereoscopic image may be determined on the basis of a method of determining whether to allow a stereoscopic image using a viewer's face image (S224). The method of determining whether to allow a stereoscopic image using a face image may use the foregoing method as it is.

On the other hand, it may occur a case where face information required for the step of determining whether to allow a stereoscopic image (S200) cannot be accurately acquired in the step of acquiring face information (S100). For example, when it is set that whether to allow a stereoscopic image is determined on the basis of an interpupillary distance, the interpupillary distance may not be accurately recognized by a malfunction of the sensor unit 200 or the like. Furthermore, when it is set that whether to allow a stereoscopic image is determined on the basis of a viewer's face image, the viewer's face image may not be accurately recognized because the viewer's face image has not been accurately captured. Even when whether to allow a stereoscopic image is determined on the basis of the two kinds of criteria, the foregoing problem may occur in a similar manner when the two kinds of problems or the like occur at the same time.

The user may set a basic configuration (default state) as to whether to allow a stereoscopic image by considering such a case. The default state may be set to one of the three kinds of configurations as to the whether to allow a stereoscopic image.

When the default state is set to a first configuration, an image may be displayed in a first configuration in which viewing a stereoscopic image is allowed if face information cannot be accurately acquired and thus it may not be possible to determine whether to allow a stereoscopic image.

When the default state is set to a second configuration, an image may be displayed in a second configuration in which viewing a stereoscopic image is allowed in a limited manner if face information cannot be accurately acquired and thus it may not be possible to determine whether to allow a stereoscopic image.

When the default state is set to a third configuration, an image may be displayed in a third configuration in which viewing a stereoscopic image is not allowed if face information cannot be accurately acquired and thus it may not be possible to determine whether to allow a stereoscopic image.

The default state may be entered by the input unit. Then, the default state may be stored in the storage unit.

FIG. 4A is a view illustrating an example in which a face image, whether to allow a stereoscopic image, a time limit are entered in the user DB by the input unit.

When a household is made of four members (a first through a fourth user), target viewers mainly using TV are two adults (a first user, a second user), a child (a third user), and a baby (under 5 years of age, a fourth user). In this case, the default state may be set to a third configuration in which viewing a stereoscopic image is disabled to form a good eye vision for the third and the fourth user.

Furthermore, as illustrated in FIG. 3, information on the each member may be entered through the input unit and stored in the user DB. For instance, in case of the first user, a face image is entered, and whether to allow a stereoscopic image may be entered as a first configuration because there is no problem in viewing a stereoscopic image. Furthermore, a time limit is required only when it is in a second configuration, and thus the time limit may not be entered. In case of the second user, a face image is entered, and whether to allow a stereoscopic image may be entered as a first configuration because there is no problem in viewing a stereoscopic image. Furthermore, a time limit is required only when it is in a second configuration, and thus the time limit may not be entered. In case of the third user, a face image is entered, and whether to allow a stereoscopic image may be entered as a second configuration because there viewing a stereoscopic image is required to be restricted. Furthermore, a time allowed to view in a stereoscopic image mode for a day may be entered into a time limit input column. In case of the fourth user, a face image is entered, and whether to allow a stereoscopic image may be entered as a third configuration because viewing a stereoscopic image is required to be prohibited.

As described above, the user DB required to determine whether to allow a stereoscopic image on the basis of a face image may be established.

FIG. 4B is an view illustrating an example in which an interpupillary distance criterion and a time limit for determining whether to allow a stereoscopic image are entered in the input unit.

Referring to FIG. 4B, according to an embodiment of the present invention, the target viewer is entered as a third configuration in which viewing a stereoscopic image is restricted when the interpupillary distance is less than 5 cm, and entered as a second configuration in which viewing a stereoscopic image is allowed in a limited manner when the interpupillary distance is greater than or equal to 5 cm but less than 5.5 cm, and entered as a first configuration in which viewing a stereoscopic image is allowed when the interpupillary distance is greater than and equal to 5.5 cm. Furthermore, a time allowed for the target viewer to whom viewing a stereoscopic image is allowed in a limited manner for a day is entered as 30 minutes. As described above, the user, when the need arises, may freely enter an interpupillary distance and a time limit at the input unit. Accordingly, a criterion for determining whether to allow a stereoscopic image may be suitably determined according to circumstances, thereby adequately protecting a person disqualified for viewing a stereoscopic image.

FIG. 5 is a view illustrating a state in which an image is displayed in a second configuration or third configuration in an image display apparatus.

Figure 5A:
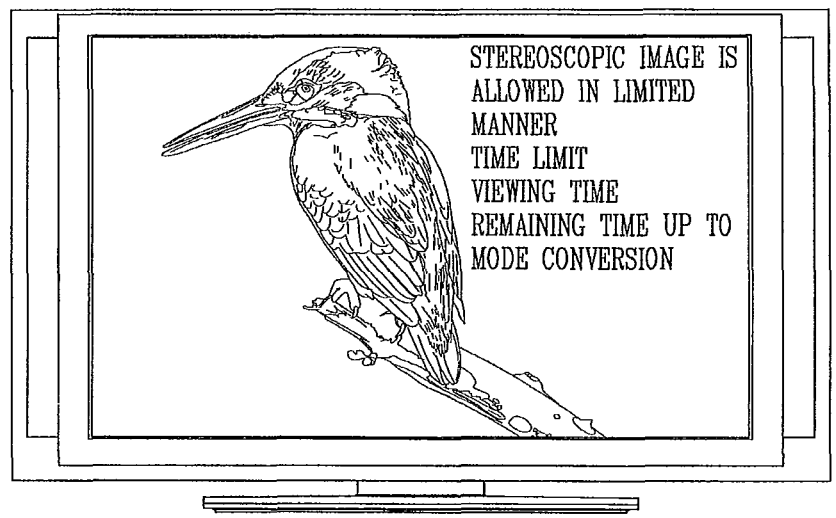
FIGS. 5A and 5B (also referred to herein below as FIG. 5) are views illustrating a state in which an image is displayed in a second configuration or third configuration in an image display apparatus.

FIG. 5A is a view illustrating a state in which an image is displayed in a second configuration. Referring to FIG. 5A, when an image is displayed in a second configuration, it may be possible to display that a stereoscopic image is allowed in a limited manner. Furthermore, in the second configuration, a time for displaying a stereoscopic image may be limited, thereby displaying a time limit. Furthermore, the amount of time that has been viewed in a stereoscopic image mode up to the present for the user's convenience may be displayed. Furthermore, the remaining time for viewing in a stereoscopic image mode may be displayed. In this case, a child may recognize the state for himself or herself, and moreover, the protector may view a screen displayed on the display unit and take an action for protecting the child. In addition, an alarm or the like may be used when a limit time for viewing has passed to inform the state to the viewer and protector in an accurate manner. Through the alarm, the viewer or protector can certainly recognize that a limit time for viewing has passed.

Figure 5B:
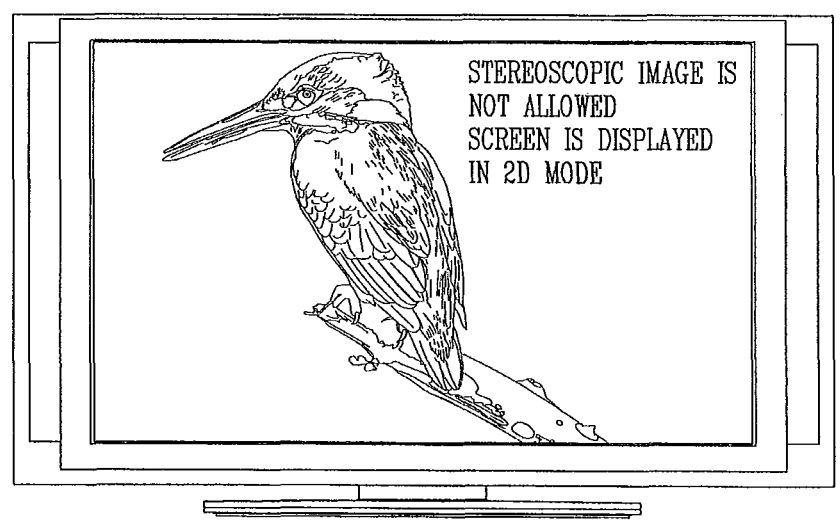

FIG. 5B is a view illustrating a state in which an image is displayed in a third configuration. Referring to FIG. 5B, when an image is displayed in a third configuration, it may be possible to display a screen on which viewing a stereoscopic image is disabled. Through the content of the screen, the viewer may easily recognize that viewing a stereoscopic image is not allowed. If the user is a viewer to whom viewing a stereoscopic image is not restricted, he or she may check the current state through the foregoing message and take an action for viewing a stereoscopic image.

Hereinafter, an image display method according to a first embodiment of the present invention will be described with reference to FIG. 6. According to a first embodiment of the present invention, it is preset such that whether to allow a stereoscopic image is determined on the basis of only a viewer's interpupillary distance. According to a first embodiment of the present invention, it is illustrated a state that the highest priority is set to a third configuration, and the lowest priority is set to a first configuration.

Figures 6B, 6C:
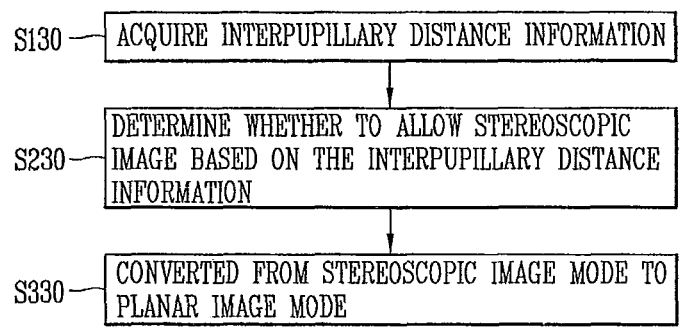

FIG. 6A is a view schematically illustrating a situation in which a viewer views TV while displaying an image. FIG. 6B is a flow chart illustrating an image display method according to a first embodiment of the present invention, and FIG. 6C is a view illustrating a preset interpupillary distance criteria for determining whether to allow a stereoscopic image.

An image display method according to a first embodiment of the present invention may include acquiring a viewer's interpupillary distance information (S130), determining whether to allow a stereoscopic image based on the interpupillary distance information (S230), and converting a stereoscopic image mode into a planar image mode based on a result of the determination (S330). Hereinafter, the steps included in an image display method according to a first embodiment of the present invention will be described.

First, in the step of acquiring interpupillary distance information (S130), the interpupillary distance information of each viewer may be acquired. For example, the sensor unit 200 in the stereoscopic image display apparatus may recognize the faces of the first viewer and second viewer as images, and acquire the interpupillary distances of the viewers.

In the step of determining whether to allow a stereoscopic image (S230), the whether to allow a stereoscopic image may be determined by using the interpupillary distances of the first and the second viewer. The foregoing step may be carried out by the controller 100. At this time, the controller 100 may use an interpupillary distance criteria table for whether to allow a stereoscopic image stored in the storage unit 400. The controller 100 may determine that the interpupillary distance of the first and the second viewer that has been measured in the step of acquiring interpupillary distance information (S130) corresponds to which row of the criteria table. According to a first embodiment of the present invention, the controller may determine that the first viewer corresponds to a first configuration, and the second viewer corresponds to a third configuration.

A processing method in case where a plurality of viewers are recognized and whether to allow a stereoscopic image is determined as a plurality of configurations will be configured as follows. For instance, the priorities of the first through third configurations may be set, and an image may be displayed in a configuration with the highest priority. Typically, the highest priority may be set to a third configuration, and the lowest priority may be set to a first configuration to protect a person disqualified for viewing a stereoscopic image. According to a first embodiment of the present invention, it is illustrated a state that the highest priority is set to a third configuration, and the lowest priority is set to a first configuration.

According to a first embodiment of the present invention, a first and a third configuration are recognized, and thus whether to allow a stereoscopic image can be determined as a third configuration.

In the conversion step (S230), a stereoscopic image mode may be converted into a planar image mode on the basis of the whether to allow a stereoscopic image. In the previous step, the whether to allow a stereoscopic image was determined as a third configuration, and thus it is in a state that viewing a stereoscopic image is disabled. Accordingly, when a screen has been displayed on TV in a stereoscopic image mode, it may be immediately converted into a planar image mode to display the screen.

Hereinafter, an image display method according to a second embodiment of the present invention will be described with reference to FIG. 7.

According to a second embodiment of the present invention, it is preset such that a viewer's face image is preferentially considered and then the viewer's interpupillary distance is considered as the next criterion to determine whether to allow a stereoscopic image. According to a second embodiment of the present invention, it is illustrated a state that the highest priority is set to a third configuration, and the lowest priority is set to a first configuration.

Figures 7B, 7C:
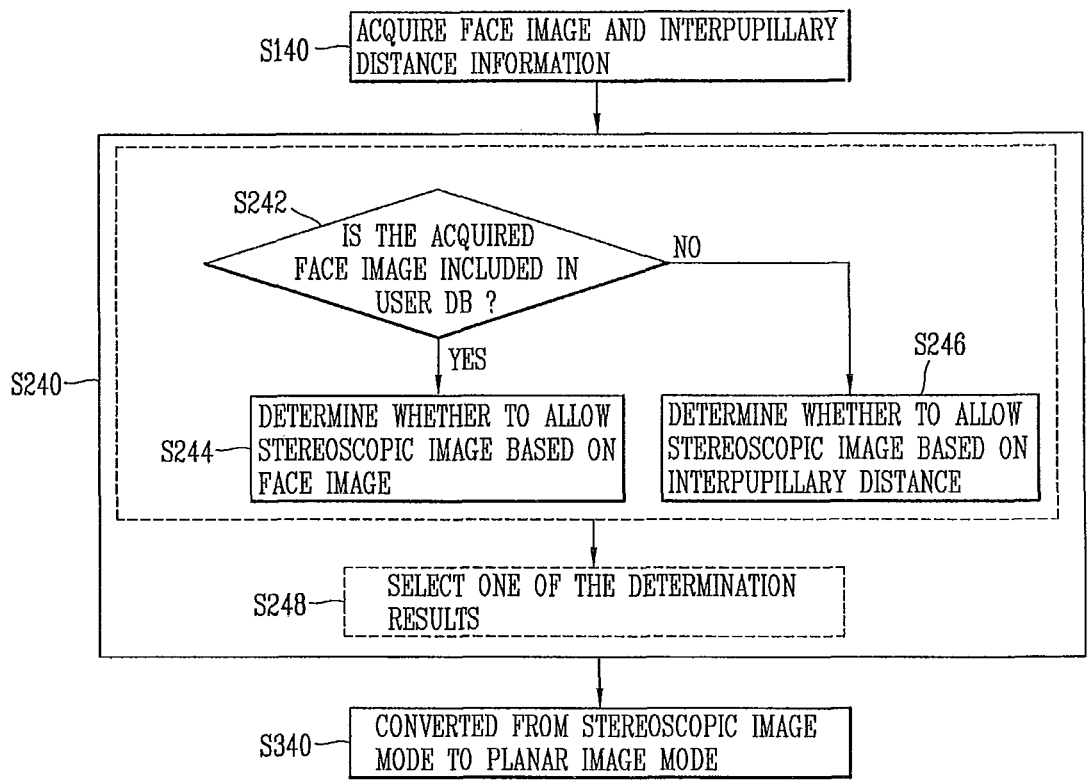
Figure 7D:

FIG. 7A is a view schematically illustrating a situation in which a viewer views TV while displaying an image. FIG. 7B is a flow chart illustrating an image display method according to a second embodiment of the present invention, and FIG. 7C is a view illustrating a preset interpupillary distance criteria table for determining whether to allow a stereoscopic image. FIG. 7D is a view illustrating the user DB for determining whether to allow a stereoscopic image.

An image display method according to a second embodiment of the present invention may include acquiring a viewer's interpupillary distance information and face image information (S140), determining whether to allow a stereoscopic image based on the face image information and interpupillary distance information (S240), and converting a stereoscopic image mode into a planar image mode based on a result of the determination (S340). Hereinafter, the steps included in an image display method according to a second embodiment of the present invention will be described.

First, in the step of acquiring the face image information and interpupillary distance information (S140), the face image information and interpupillary distance information of each viewer may be acquired. For example, the sensor unit 200 in the stereoscopic image display apparatus may acquire the face images of the first viewer and second viewer, and acquire the interpupillary distances of the first viewer and second viewer.

In the step of determining whether to allow a stereoscopic image (S240), the whether to allow a stereoscopic image may be determined by using the face images and interpupillary distances of the first and the second viewer. The foregoing step may be carried out by the controller 100. At this time, the controller 100 may use a user database and an interpupillary distance criteria table for whether to allow a stereoscopic image stored in the storage unit 400.

In case of the first viewer, the face image was inaccurately captured as a whole but the pupillary portion was accurately captured. Accordingly, in the step of retrieving whether the acquired face image is included in the user DB (S242), it may be determined that the viewer's face image is not included in the user DB. In this case, the data of the first viewer may determine whether to allow a stereoscopic image using an interpupillary distance.

Referring to FIG. 7C, the interpupillary distance of the first viewer was measured as 6.5 cm, and thus the whether to allow a stereoscopic image may be determined as a first configuration by the table of FIG. 7C.

In case of the second viewer, the face image was accurately captured. In this case, in the step of retrieving whether the acquired face image is included in the user DB (S242), a face image stored therein matching to the face image can be retrieved. Referring to FIG. 7D, the face image matching to the second viewer's face image is stored in the third DB. Accordingly, in the retrieval step (S242), it may be confirmed that the second viewer is a user included in the third DB. Furthermore, according to the foregoing method, whether to allow a stereoscopic image for the second viewer may be determined as a third configuration.

As described above, according to a second embodiment of the present invention, the controller may determine that the first viewer corresponds to a first configuration, and the second viewer corresponds to a third configuration.

According to a second embodiment of the present invention, the highest priority is set to a third configuration, and the lowest priority is set to a first configuration, and thus the whether to allow a stereoscopic image may be determined as a third configuration (S248).

In the conversion step (S340), a stereoscopic image mode may be converted into a planar image mode on the basis of the whether to allow a stereoscopic image. In the previous step, the whether to allow a stereoscopic image was determined as a third configuration, and thus it is in a state that viewing a stereoscopic image is disabled. Accordingly, when a screen has been displayed on TV in a stereoscopic image mode, it may be immediately converted into a planar image mode to display the screen.

Hereinafter, an image display method according to a third embodiment of the present invention will be described with reference to FIG. 8. According to a third embodiment of the present invention, it is preset such that a viewer's face information cannot be acquired at all. Furthermore, it is illustrated a state that the default state is set to a third configuration.

Figure 8A:
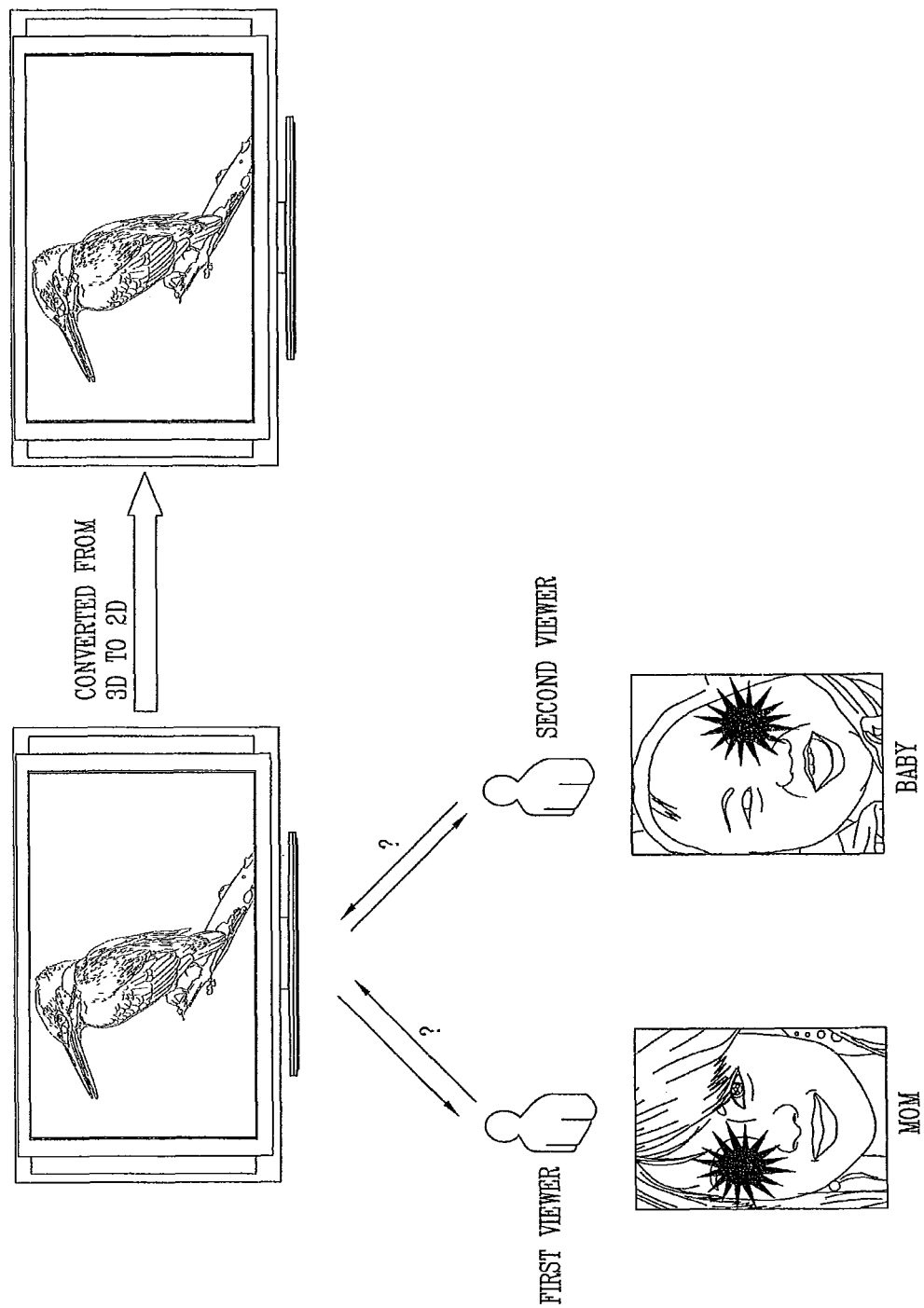
FIGS. 8A and 8B (also referred to herein below as FIG. 8) are views illustrating an image display method according to a third embodiment of the present invention.
Figure 8B:
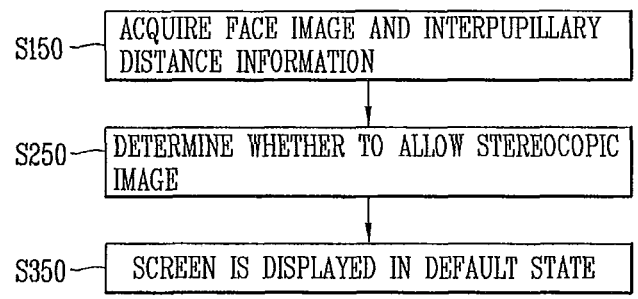

FIG. 8A is a view schematically illustrating a situation in which a viewer views TV while displaying an image. FIG. 8B is a flow chart illustrating an image display method according to a third embodiment of the present invention.

An image display method according to a third embodiment of the present invention may include acquiring a viewer's face information (S150), determining whether to allow a stereoscopic image based on the interpupillary distance information (S250), and displaying an image based on a result of the determination (S350). Hereinafter, the steps included in an image display method according to a third embodiment of the present invention will be described.

First, in the face information acquisition step (S150), a viewer's face information may be acquired. According to a third embodiment of the present invention, a viewer's face information cannot be acquired at all due to a cause such as a malfunction of the sensor unit or the like.

In the step of determining whether to allow a stereoscopic image (S250), no information was acquired in the acquisition step (S150), and thus the whether to allow a stereoscopic image may be determined as a default state. According to a third embodiment of the present invention, the default state was assumed as a third configuration, and thus the whether to allow a stereoscopic image is determined as a third configuration.

In the image display step (S350), a stereoscopic image mode may be converted into a planar image mode on the basis of the whether to allow a stereoscopic image. In the previous step, the whether to allow a stereoscopic image was determined as a third configuration, and thus it is in a state that viewing a stereoscopic image is disabled. Accordingly, when a screen has been displayed on TV in a stereoscopic image mode, it may be immediately converted into a planar image mode to display the screen.

The foregoing image display methods according to the embodiments of the present invention may be used in an individual or combined manner. Furthermore, the steps constituting each embodiment may be used in an individual or combined manner with the steps constituting another embodiment.

According to an image display method according to the present invention, it may have an effect of protecting a target viewer during the vision formation process or a target viewer disqualified for viewing a stereoscopic image. Furthermore, a criterion for determining a target viewer may be defined in a specific manner, thereby accurately determining the target viewer, and enhancing the user's convenience.

According to an embodiment of the present invention, the foregoing method may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller of the mobile terminal.

Although the preferred embodiments of the present invention have been described in detail, the rights scope of the present invention is not limited to the embodiments and various modifications and improvements thereto made by those skilled in the art using the basic concept of the present invention as defined in the accompanying claims will fall in the rights scope of the invention.

What is claimed is:

1. A method for displaying screen information, the method comprising:
   storing a face image of a user to whom viewing a stereoscopic image is allowed;
   acquiring a face image of a viewer viewing the screen information; and
   displaying the screen information as a stereoscopic image or a planar image based on whether the face image of the viewer matches the face image of the user,
   wherein the screen information is displayed as the stereoscopic image when the face image of the viewer matches the face image of the user, and the screen information is displayed as the planar image when the face image of the viewer does not match the face image of the user.

2. The method of claim 1, wherein the displaying the screen information as the stereoscopic image comprises:
   displaying the screen information as the stereoscopic image when the face image of the viewer satisfies a predetermined condition;
   displaying the screen information as the stereoscopic image during a preset time when the face image of the viewer does not satisfy the predetermined condition; and
   converting the screen information from the stereoscopic image to the planar image after the preset time.

3. The method of claim 2, wherein the preset time is set by the user.

4. The method of claim 2, further comprising:
   displaying at least one of a time limit, a remaining time up to an image mode conversion, and a viewing time when the screen information is displayed as the stereoscopic image during the preset time.

5. The method of claim 2, further comprising displaying a message or image as to whether to allow the stereoscopic image.

6. The method of claim 2, further comprising outputting an alarm in response to a lapse of the preset time.

7. An image display apparatus, the apparatus comprising:
   a sensor unit configured to acquire a face image;
   a memory configured to store a face image of a user to whom viewing a stereoscopic image is allowed;

a display unit configured to display screen information as a stereoscopic image or a planar image; and a controller configured to:
- acquire a face image of a viewer viewing the screen information; and
- display the screen information as a stereoscopic image or a planar image based on whether the face image of the viewer matches the face image of the user,
- wherein the screen information is displayed as the stereoscopic image when the face image of the viewer matches the face image of the user, and the screen information is displayed as the planar image when the face image of the viewer does not match the face image of the user.

8. The apparatus of claim 7, wherein when the face image of the viewer matches the face image of the user, the controller is further configured to:
- display the screen information as the stereoscopic image when the face image of the viewer satisfies a predetermined condition;
- display the screen information as the stereoscopic image during a preset time when the face image of the viewer does not satisfy the predetermined condition; and
- convert the screen information from the stereoscopic image to the planar image after the preset time.

9. The apparatus of claim 8, wherein the preset time is set by the user.

10. The apparatus of claim 8, wherein the controller is further configured to display at least one of a time limit, a remaining time up to an image mode conversion, and a viewing time when the screen information is displayed as the stereoscopic image during the preset time.

11. The apparatus of claim 8, wherein the controller is further configured to output an alarm in response to a lapse of the preset time.

12. The apparatus of claim 7, wherein the controller is further configured to display a message or image as to whether to allow the stereoscopic image.

* * * * *